March 31, 1931.         G. MAIURI ET AL         1,798,946
ABSORPTION REFRIGERATING SYSTEM
Filed Nov. 20, 1930        2 Sheets-Sheet 2

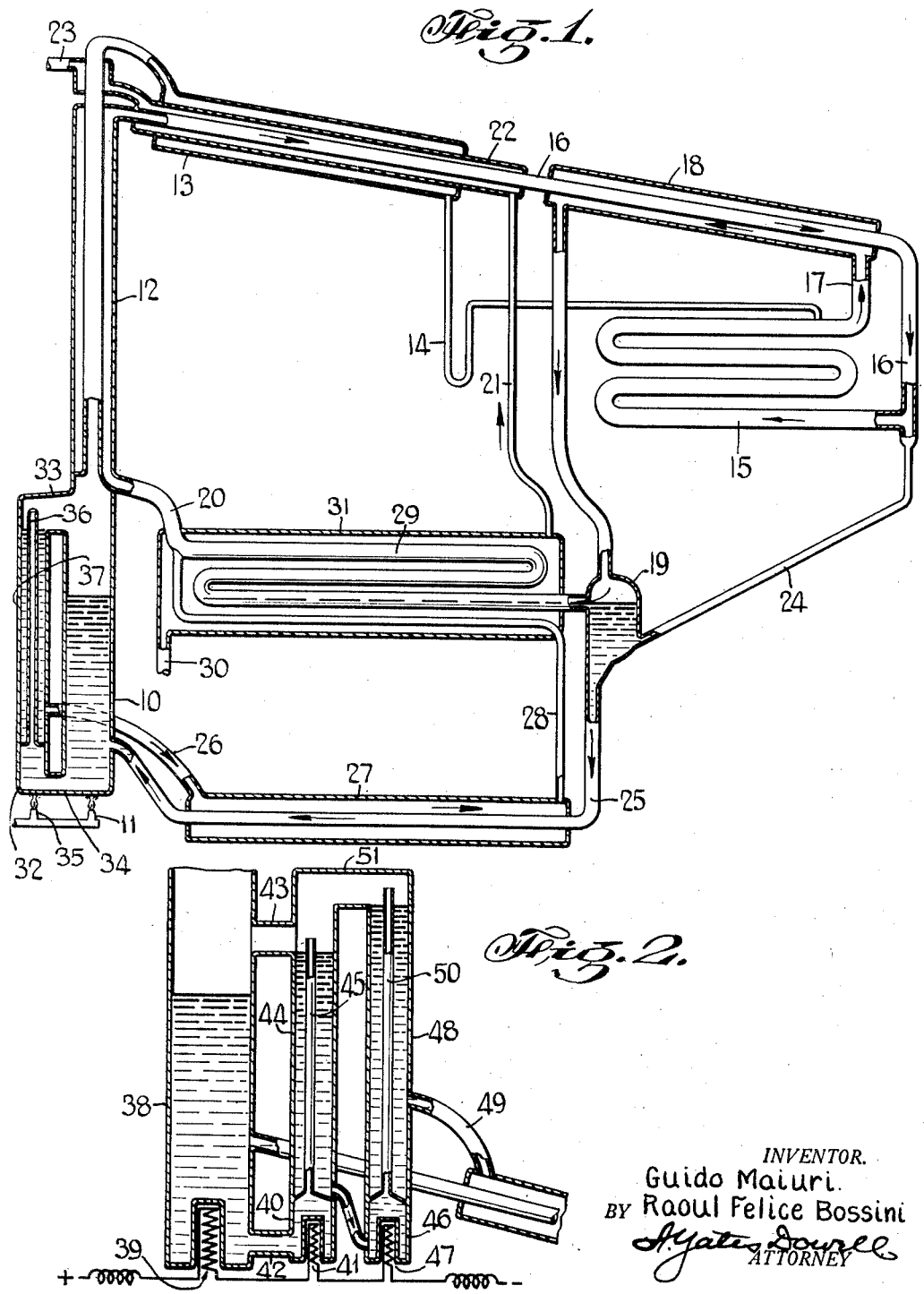

*Fig. 3.*

INVENTOR.
Guido Maiuri.
BY Raoul Felice Bossini.
ATTORNEY

Patented Mar. 31, 1931

1,798,946

UNITED STATES PATENT OFFICE

GUIDO MAIURI AND RAOUL FELICE BOSSINI, OF LONDON, ENGLAND, ASSIGNORS TO PLATEN-MUNTERS REFRIGERATING SYSTEM AKTIEBOLAG, OF STOCKHOLM, SWEDEN, A CORPORATION OF SWEDEN

ABSORPTION REFRIGERATING SYSTEM REISSUED

Application filed November 20, 1930, Serial No. 496,895, and in Great Britain April 18, 1929.

This invention relates to refrigerating systems of the absorption type and more particularly to a method of and means for effecting circulation between the generator and absorber of a continuous absorption refrigerating system having all parts in open communication and operated solely by heat.

In apparatus of this type circulation of liquid is usually effected by thermosiphonic action, for example by the provision of a heat pump utilizing the expulsion of refrigerant vapor to lift liquid in an ascending pipe. Regulation of such a pump has been found to be difficult.

An object of this invention is to provide an improved method of and means for circulating the liquid in an absorption refrigerating system of this type which are easy to regulate.

According to this invention weak absorption liquid from the boiler is subjected to further heating to lift the liquid to a higher level from which it flows to the absorber by gravity. The weak absorption liquid may be heated in successive stages and the circulation of liquid may be controlled by regulating the heat to which the weak liquid is subjected. This invention also contemplates the lifting of weak absorption liquid by ebullition of the liquid after thermal expansion of refrigerant vapor therefrom.

This invention will be readily understood by referring to the following description taken in connection with the accompanying drawings in which Fig. 1 is a diagrammatic view in vertical section of a refrigerating system contemplated by this invention;

Fig. 2, a detail diagrammatic view in vertical section of a generator modified in accordance with this invention; and Fig. 3, a diagrammatic view in vertical section of a refrigerating system including the generator shown in Fig. 2 further modified according to this invention.

Referring to Fig. 1, a generator 10 containing a solution of ammonia and water is heated by any desired means such as gas burner 11. Ammonia vapor driven out of solution in the generator passes through rectifier 12 to a condenser 13 in which the vapor is cooled and liquefied. Liquid ammonia passes through a liquid seal 14 into the evaporator 15.

In the evaporator the refrigerant is evaporated and diffuses into inert gas which enters the evaporator through conduit 16, the inert gas passing in counter flow to the liquid refrigerant in the evaporator.

The resulting gas mixture leaves the evaporator through conduit 17 and passes through a heat exchanger 18 in heat exchange relation with the inert gas flowing through conduit 16. From the heat exchanger 18 the gas mixture passes into the absorber 19 where the ammonia vapor is absorbed by the weak absorption liquid and the inert gas leaves by conduit 20 and returns through the outer jacket of rectifier 12 back to the conduit 16. Circulation of the inert gas is effected in the usual manner by heating the ascending column of gas in the rectifier 12 and cooling the descending column of gas in the conduit 16. The ascending column of gas is heated by the hot ammonia vapor from the generator 10 and the descending column of gas is cooled first by water from conduit 21 flowing in jacket 22 around the conduit 16 and going to waste through conduit 23, and then by the cold gas mixture from the evaporator passing through the jacket 18 around the conduit 16. A small pipe 24 is provided to remove any vapor condensed in conduit 16 and to conduct the same to absorber 19.

The strong liquor from the absorber 19 is returned to the generator through conduit 25 in heat exchange relation with the weak liquor being supplied to the absorber from the generator through conduit 26, jacket 27, and conduit 28 which communicates with the upper part of the coil 29 which acts as the cooling surface of the absorber. The absorber is cooled by water from conduit 30 flowing around the coil 29 in jacket 31, then discharging through conduit 21.

A secondary generator or boiler 32 communicates with the main generator 10 at the top through vapor passage 33 and at the bottom through passage 34. The secondary generator 32 is heated either by the same means employed for heating the main generator 10 or by a separate means such as burner 35.

Weak liquor from the main generator 10 passing through conduit 34 into the secondary generator 32 is heated and passes upwardly through a conduit 36. Ammonia vapor driven out of solution in the secondary generator passes from the upper end of conduit 36, through passage 33, and then along with the vapor from the main generator 10 upwardly through the rectifier 12 to the condenser 13. Weak ammonia liquid pumped from the upper end of conduit 36 in the secondary generator 32 collects in the chamber 37 until it reaches a level higher than the liquid level in the absorber when it will then flow through conduit 26, heat exchanger 27, and conduit 28 into the absorber.

By controlling the heat applied to the secondary generator, it is possible to control the liquid flow between the generator and absorber. In order to increase the capacity of the machine, the weak absorption liquid may be pumped to a higher level by providing a plurality of secondary generators in which the liquid is lifted successively by being subjected to successive applications of heat as shown in Fig. 2. A main generator 38 containing a solution of ammonia vapor and water is heated by some means such as an electric heating element 39. A secondary generator 40 may be heated by an electric heating element 41 and is connected to the bottom of the main generator by conduit 42 and communicates at its upper portion with the vapor space in the main generator through conduit 43. Weak liquor is pumped to a higher level in chamber 44 of this secondary generator through conduit 45 in the well known manner. In secondary generator 46 heated by an electric heating element 47 weak absorption liquid from chamber 44 in the first secondary generator 40 is pumped through conduit 50 to a still higher level in chamber 48 from which the weak liquor flows to the absorber through conduit 49. The pressures in each of the generators are equal but the liquid becomes successively weaker in each succeeding generator and the percentage of absorption liquid which evaporates in each generator corresponds to the strength of the liquid therein and is greatest in the generator in which the liquid is weakest. The raising of the level of the absorption liquid in the secondary generators is accomplished both by the heat pump action of the rising ammonia vapor driven out of solution by heat and also by ebullition of the absorption liquid.

In the last secondary generator the absorption liquid may be so weak that the vapors evolved comprise a relatively high percentage of absorption liquid vapor, in which case it may be desirable to convey the vapor issuing from the conduit 50 in the last generator 46 directly into the absorber instead of allowing it to pass through the conduit 51 to the rectifier. This may be done as shown in Fig. 3 which shows the main generator and secondary generators of Fig. 2 modified and connected in the system shown in Fig. 1. The upper part of chamber 48 of the last secondary generator 46, is not connected to the vapor space above the main generator 38 but is connected through a conduit 52 directly to the absorber 19. The liquid circulation between the absorber and the generator may be controlled by regulating the heating of the secondary generators.

It will be obvious to those skilled in the art that various other changes may be made in the construction and arrangement without departing from the spirit of the invention and therefore the invention is not limited to what is shown in the drawings and described in the specification but only as indicated in the appended claims.

We claim:

1. In a refrigerating system of the absorption type the method of circulating liquid between the absorber and the generator which comprises separating weak absorption liquid from the generator, heating the weak absorption liquid thus separated in successive steps to expel vapor therefrom to successively raise the level thereof, conducting the vapor thus expelled to the vapor space in the generator, conducting the weak absorption liquid to the absorber by gravity, and returning enriched absorption liquid from the absorber to the generator by gravity.

2. In a refrigerating system of the absorption type the method of circulating liquid between the generator and absorber which comprises separating weak absorption liquid from the generator, heating the weak absorption liquid thus separated in successive steps to expel substantially all refrigerant vapor therefrom to successively raise the level thereof, conducting the vapor thus expelled to the vapor space in the generator, further heating the weak absorption liquid to further raise the level thereof by foaming, conducting vapor resulting from the last heating to the absorber, conducting the weak absorption liquid to the absorber by gravity, and returning enriched absorption liquid from the absorber to the generator by gravity.

3. An absorption refrigerating apparatus having all parts in open fluid communication including a generator containing a solution of refrigerant in an absorption liquid, heating means for said generator to expel refrigerant vapor from the solution contained therein, a condenser for liquefying the refrigerant vapor thus expelled, a refrigerating element, means for conducting liquid refrigerant from the condenser to said element, an absorber, means for conducting vaporized refrigerant from said element to said absorber, a plurality of thermo-siphon pumps for successively raising the level of the weak absorption liquid from said generator, separate heating means for each of said pumps, a conduit for weak absorption liquid from said pumps to the absorber, a conduit for refrigerant vapor from said pumps to the condenser, and an enriched absorption liquid return connection from the absorber to the generator.

4. Absorption refrigerating apparatus of the pressure equalized type including a generator, an absorber, a plurality of thermo-siphon pumps for raising the level of weak absorption liquid from the generator, separate heating means for said pumps, means for returning refrigerant vapor from said pumps to the vapor space in the generator, a heat pump for further raising the weak absorption liquid by ebullition thereof, heating means for last said pump, means for conducting vapor from last said pump to the absorber, a conduit for conducting weak absorption liquid raised by the last said pump to the absorber, and means for returning enriched absorption liquid from the absorber to the generator.

In testimony whereof we affix our signatures.

GUIDO MAIURI.
RAOUL FELICE BOSSINI.